US012686590B2

(12) United States Patent
Turler et al.

(10) Patent No.: US 12,686,590 B2
(45) Date of Patent: Jul. 21, 2026

(54) SWITCH ARRANGEMENT FOR A LIFT, IN PARTICULAR A PERSONNEL LIFT AND/OR A GOODS LIFT

(71) Applicant: EMCH Aufzüge AG, Bern (CH)

(72) Inventors: Daniel Turler, Boll (CH); Thomas Zurfluh, Hinterkappelen (CH)

(73) Assignee: EMCH Aufzüge AG, Bern (CH)

( * ) Notice: Subject to any disclaimer, the term of this patent is extended or adjusted under 35 U.S.C. 154(b) by 1150 days.

(21) Appl. No.: 17/656,892

(22) Filed: Mar. 29, 2022

(65) Prior Publication Data

US 2022/0315380 A1 Oct. 6, 2022

(30) Foreign Application Priority Data

Mar. 30, 2021 (CH) .......................................... 00330

(51) Int. Cl.
*B66B 1/46* (2006.01)
*B66B 1/52* (2006.01)

(52) U.S. Cl.
CPC ................ *B66B 1/462* (2013.01); *B66B 1/52* (2013.01)

(58) Field of Classification Search
CPC .. B66B 1/462; B66B 1/52; B66B 1/14; H03K 17/965; H03K 17/9625; H01H 3/12
See application file for complete search history.

(56) References Cited

U.S. PATENT DOCUMENTS 5,162,665 A * 11/1992 Troyen .................... B66B 1/462 340/815.48
5,374,449 A 12/1994 Buhlmann et al.
5,587,567 A * 12/1996 Winter .................... B66B 1/462 200/600
9,952,702 B2 * 4/2018 Bünter ................. H03K 17/964
2015/0324050 A1 11/2015 Bunter
2016/0358737 A1 * 12/2016 Brooks .................. H01H 13/14
2018/0164940 A1 * 6/2018 Li ........................ G06F 3/04142
2023/0144931 A1 * 5/2023 Huang .................... G01L 1/148 73/862.628

FOREIGN PATENT DOCUMENTS

EP 2915256 B1 1/2012
EP 3018826 A1 5/2016
EP 3566996 A1 11/2019
EP 3819247 A1 5/2021
JP 2016003136 A 1/2016

OTHER PUBLICATIONS

European Search Report for European Patent Application No. 22162536 dated Aug. 19, 2022.

* cited by examiner

*Primary Examiner* — Bickey Dhakal
(74) *Attorney, Agent, or Firm* — Brian Roffe

(57) ABSTRACT

A switch arrangement for a lift, preferably a personnel lift or goods lift, including marked pushbuttons and an electrical conductor connection to a control device of the lift. The switch arrangement is provided with at least one elastically deformable plate element with the pushbuttons with the marking on the upper side of the button. A recognition element for the bending in the button is arranged beneath this plate element of the at least one pushbutton. In addition, an electrical conductor connection is provided from the recognition elements to the control device. As a result, it is possible for thinner and more user-friendly switch arrangements to be installed in or outside a lift, in particular for controlling it, or for general functions.

20 Claims, 1 Drawing Sheet

SWITCH ARRANGEMENT FOR A LIFT, IN PARTICULAR A PERSONNEL LIFT AND/OR A GOODS LIFT

FIELD OF THE INVENTION

The invention relates to a switch arrangement for a lift, preferably a personnel lift or a goods lift, which preferably comprises a plurality of pushbuttons, in case forming one button, and at least one electrical line connection to a control device of the lift.

BACKGROUND OF THE INVENTION

With a switch arrangement according to printed specification EP-A-3 018 826, for controlling a device, such as, for example, an electrical consuming component, an interface is provided with a plurality of pushbuttons, which can be actuated by means of a finger pressure, in particular applied by hand. In response to the actuating force taking effect on a pushbutton, a mechanical force is converted into a quantity of electrical energy by means of an electromechanical transformer. A visual marking capacity of the pushbutton can be presented on a display device, essentially in the zero current state. The visual marking can be changed as a function of the quantity of electrical energy which can be produced by the electromechanical transformer. An actuating force causes an elastic deformation of an overlay layer and of the display device arranged adjacent to it. A contact element serves to provide the electrical contacting of the conductor path, by means of which, as a consequence of the actuating force, the quantity of electrical energy is finally forwarded to a microcontroller or other control and switching electronics.

OBJECTS AND SUMMARY OF THE INVENTION

The invention is based on the object of providing a generic switch arrangement for a lift, in such a way that, with a robust structural format, it can be installed in a very simple and space-saving manner in or at the lift, primarily for controlling it, and thereby provides new design possibilities for its installation.

According to the invention the object is solved by providing the switch arrangement with at least one elastically deformable plate element, with the at least one pushbutton, with a recognition element beneath this plate element and assigned to the at least one pushbutton for detecting the bending in the button, an expansion measurement strip, and with the electrical conductor connection of the respective recognition element to the control device of the lift.

The switch arrangement comprises in each case at least one elastically deformable plate element with the at least one pushbutton, beneath this plate element a recognition element assigned to each pushbutton, which identifies the flexure of the button, and the electrical conduction connection of the respective recognition element to the control device.

As a result, according to the invention, it is possible for switch arrangements to be installed in or outside the lift, in particular for actuating the lift or for general functions, which are significantly thinner and more user-friendly than conventional formats.

For example, these switch arrangements according to the invention can be very advantageously integrated into a handrail, which is in any event located in the lift, on one or both side walls and/or on the rear side.

To the purpose, in each case a module is provided with the thin plate element, with a plurality of pushbuttons, with the marking on the upper side of the buttons, the recognition elements, and the electrical conductors. Such a module can be easily installed in a handrail in the lift cabin without any substantial requirement for space, in such a way that the user-friendliness is optimally achieved by its accessibility at an appropriate height.

BRIEF DESCRIPTION OF THE DRAWINGS

The invention and its further advantages are explained in greater detail hereinafter, on the basis of exemplary embodiments and by making reference to the drawing, wherein.

DETAILED DESCRIPTION OF THE INVENTION

Figure 1:
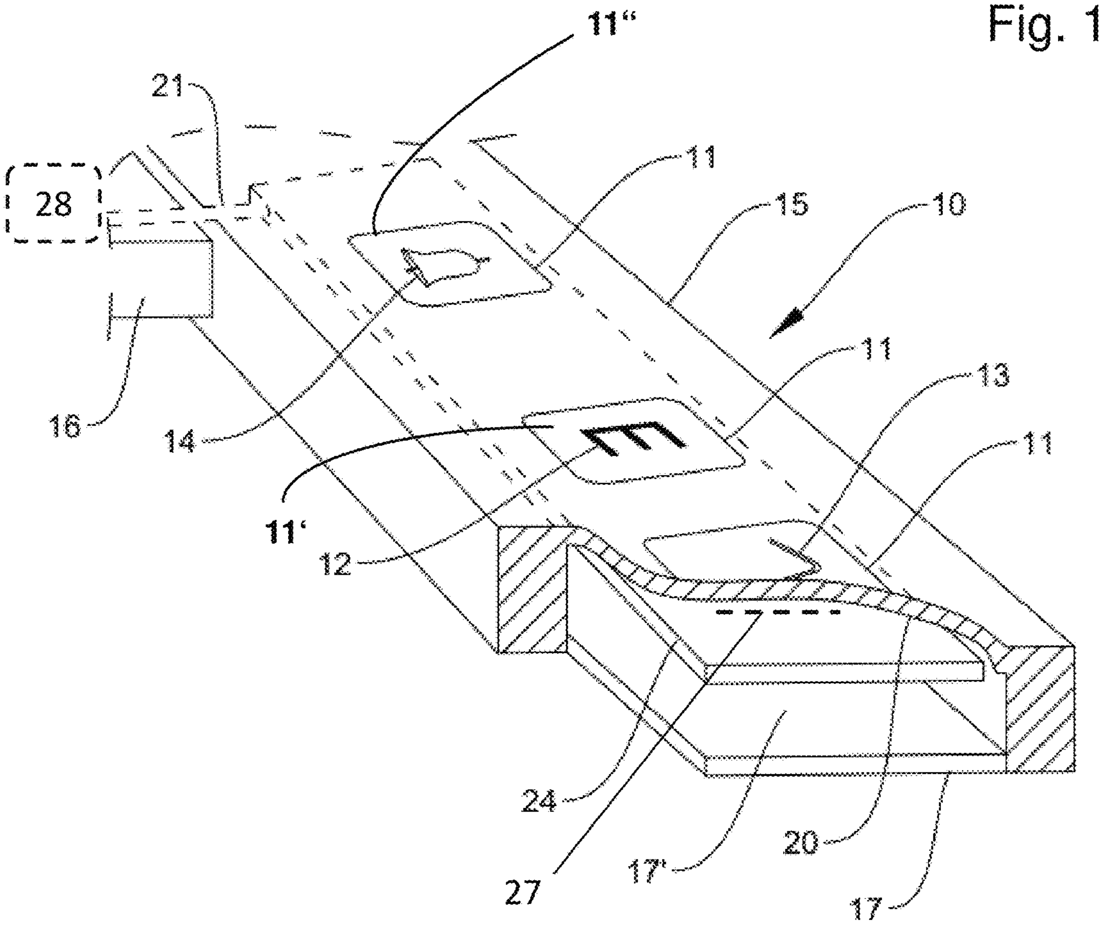
FIG. 1 is a perspective view and partially in section, a switch arrangement according to the invention in a handrail with a rectangular cross-section.

FIG. 1 shows a switch arrangement 10 for a lift, not shown in any greater detail, in particular for transporting personnel, animals, or goods of all kinds. This is a conventional commercial lift, with one or more cabins, which can be constructed in any desired size and weight capacity and any desired form. It can, moreover, be installed in all types of buildings, stations, or in outside locations. In this situation the lift comprises, for the necessary functions a known control device 28 as a central command unit, which can also be actuated by the switch arrangement 10 by means of its pushbuttons 11.

The pushbuttons 11 form in each case a button of a conventional size, approximating a thumbprint, but this may vary. In this situation they are configured as rectangular, square circular, elliptical, and/or other shapes. In addition, these pushbuttons 11 are identified in and/or next to their buttons in each by at least a number 13, a character 14, a letter 12, a word, and/or any other sign. They may, however, also be marked without any identification and only by a circumferential line on their outer circumference or in some other manner. Accordingly, the identification can be, for example, a desired floor number of the lift (12, 13), an alarm button (14), an open and close button for the doors, an external call button, and/or buttons for other functions.

According to the invention, the pushbuttons 11 are in each case contained in at least one elastically deformable plate element 20 of the respective button, and arranged beneath this plate element 20 of each pushbutton 11 is in each case a recognition element 24 for detecting the flexure in the button.

Accordingly, the one or more pushbuttons 11, with the at least one plate element 20 and the recognition element 24, can be provided with a thin overall layer thickness which can amount to a few millimeters, a maximum of between 3 and 10 millimeters.

Very advantageously, assigned to the recognition elements 24 are specifically configured expansion measuring strips 27 (only one of which is shown), and a corresponding evaluation unit, which can be connected by means of pluggable electrical conductor connections 21 to the control device 28. With such expansion measuring strips 27, these thin dimensions of the recognition elements 24 can be achieved, which are preferably formed as chip cards or printed circuit boards.

The effective buttons 11' of the pushbuttons 11 are in each case delimited by a peripheral line 11" at their outer circumference, by a different color, a different material than outside the buttons 11', and/or another means of identification marking of the button 11' which is to be touched.

The switch arrangement 10 is preferably integrated into at least one handrail 15, which, for example, is secured in the cabin. It can also be placed in a wall switch panel or the like. Shown schematically in FIG. 1 is the end of this rectangular handrail 15, preferably located in the front, at the door of the cabin, which is secured by transverse strips 16 or the like to a side wall in the cabin, at a predetermined access height. This handrail 15 serves to allow a user to hold securely or to be guided by hand. The electrical conductor connection 21 is guided by the handrail 15 through this transverse strip 16 into the wall, and from there to the control device 28 of the lift, which is usually located in a stationary control space next to the lift shaft, so that it is accessible at all times. It is, of course, also possible for more than one electrical conductor connection 21 to be provided.

In addition, a detachable cover 17 is provided on the underside of the handrail 15, which serves for the installation or repairs of the switch arrangement 10 and for access to the electrical conductor connection 21. Moreover, a hollow space 17' is provided between the cover 17 and the plate-shaped recognition element 24 for the electrical cables or the like.

To the purpose, the plate element 20 is formed with the pushbuttons 11, the recognition element 24, and the connection to the electrical conductor connection 21, as one module. Such modules can be prefabricated as printed circuit boards or chip cards and can be easily installed in the lift at the appropriate location. This rectangular part of the handrail 15 could also be secured or plugged onto the front side, with a conventional circular cross-section handrail.

With a lift for larger buildings, with several stories, it would also be possible for a plurality of modules to be arranged in a row, connected to one another by electrical conductors, directly or by means of plugs, and each in particular having a plurality of pushbuttons.

The plate element 20 with the pushbuttons 11 is preferably made of a flexible metallic material, which is connected to the recognition element 24 in such a way that, with a conventional pushing pressure with a force of between 1 Newton and max. 5 Newton onto the plate element 20, the expansion measuring strip is bent, and, as a consequence of this, a measurement signal is sent by means of a signal transfer to the control device 28 of the lift. With this switch arrangement 10, provision can be made for an acoustic signal and/or illumination to be generated when the pressure on the button is detected, and this can be heard or seen by the user as confirmation. This plate element 20, with the pushbuttons 11, can also consist of a multi-layer material or of a plastic.

By contrast with touch screens, there is the further advantage that these pushbuttons 11 can also be actuated precisely as well when wearing gloves or by disabled persons with finger prostheses, when a button press is produced with sufficient pressing force.

To advantage, the pushbuttons 11 are formed in the plate element 20 by this single plate, without gaps at their circumferences and without any shoulder projections. As a result, the switch arrangement 10 can be cleaned with powerful cleaning agents or with water at high pressure without penetration, and it is also protected against damage caused by misuse.

Figure 2:
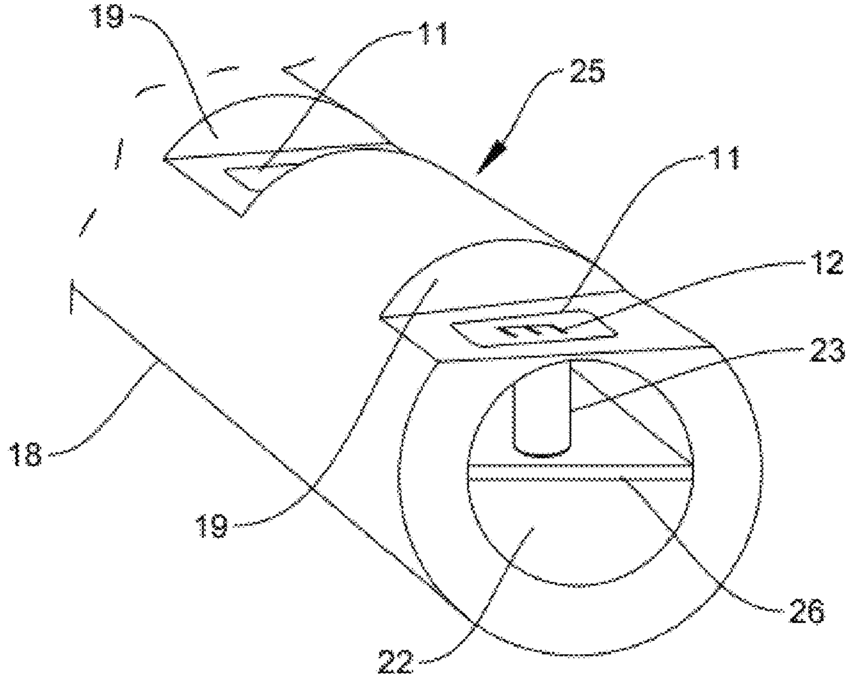
FIG. 2 is a variant of a switch arrangement according to the invention, represented in a perspective view and partially in section, in a handrail with a round cross-section.

FIG. 2 shows a switch arrangement 25 of a lift, which is integrated in a handrail 18 formed with a circular cross-section. It is inherently configured in the same way as that according to FIG. 1. Accordingly, the differences are explained hereinafter. Shown schematically is the end of this handrail 18, preferably located at the front by the cabin door, in the form of a bar or tube. This handrail 18 is likewise secured in the cabin at a predetermined accessible height, by transverse strips or similar, to a side wall or rear wall. There are two pushbuttons 11 shown, separated from one another. It is also possible, however, for more than two of these to be provided.

According to the invention, the pushbuttons 11 are in each case contained in an elastically deformable plate, with the identification on the upper side of the respective button, and arranged beneath this plate element of the respective pushbutton 11 is a recognition element 26 for detecting the bending in the button. The recognition element 26 can be configured as a module for the two pushbuttons 11.

Since the recognition element 26 is arranged approximately in the centre in the interior of the handrail 18, a mechanical coupling piece 23 is arranged for bridging the distance between it and the outside plate element 20 with the pushbutton 11. Accordingly, when a button is pressed, a transfer takes place of the bending of the pushbutton 11, by way of this coupling piece 23, onto the recognition element 26. In addition, the electrical conductor connection, not shown, is guided in the cavity 22 formed in the handrail 18. With this structural design, trouble-free function of this switch arrangement 25 is guaranteed, and with the tubular handrail 18 a simple structural arrangement can be achieved.

The two pushbuttons 11 are in each case contained in a pocket 19, in a segmented manner in the form of a slot. As a result, it can be ensured that they are not unintentionally pressed when the handrail 18 is touched or held.

The invention is further characterized in that any desired decoration strip can be applied to the plate element 20, preferably with the button(s) represented, for example a strip of leather or fabric, a wood veneer, a glass plate, or similar materials. In this way, a wide variety of embodiments of the switch arrangements can be created in the context with the concept of the cabin design.

This circular cross-section handrail 18 is preferably dimensioned with an outer diameter of 35 to 45 millimeters, and this is sufficient for no change of cross-section to be necessary in the region of the switch arrangement 25.

The recognition elements of the pushbuttons 11, connected to the control device 28 of the lift by the electrical conductor connections 21, are provided with a power supply at a voltage of preferably 3V to 24V, such that, when the pushbutton 11 is pressed, and therefore the expansion measuring strips 27 are bent, the change in electrical resistance in the expansion measuring strips 27 can be detected perfectly.

The invention has been adequately described by the exemplary embodiments presented heretofore. It could also be explained by further variants. For example, it would likewise be possible to use as the recognition elements, instead of expansion measuring strips, piezoelectric sensors or similar. The plate element could also be dimensioned with a thinner thickness in the region of the buttons, in order to increase their flexure.

If a handrail is used, it can exhibit the circular or angular cross-section as shown, or another shape, such as multi-angular, oval, or angular with rounded corners.

The electrical conductor connection 21 can be guided from the handrail 15 through this transverse strip or through other passage routes into the wall, and from there to the control device 28 of the lift, which is usually located in a stationary control space next to the lift shaft, in order for it to be accessible at all times.

This switch arrangement according to the invention could equally well be placed in a wall in the cabin, or outside in the region of the door frame, for operating when the cabin is called to a particular story of the building.

While particular embodiments of the invention have been shown and described, it will be obvious to those skilled in the art that changes and modifications may be made without departing from the invention in its broader aspects, and, therefore, the aim in the appended claims is to cover all such changes and modifications as fall within the true spirit and scope of the invention.

The invention claimed is:

1. Switch arrangement for a lift, comprising:

at least one elastically deformable plate element, at least one pushbutton contained in the at least one elastically deformable plate element, at least one recognition element beneath the at least one elastically deformable plate element and configured to detect bending of the at least one pushbutton, an expansion measurement strip assigned to each of the least one recognition element and configured to provide a measure of the bending of the at least one pushbutton, at least one electrical conductor connection connecting the at least one recognition element to a control device of the lift, wherein the switch arrangement is integrated for its operation in at least one handrail in or next to the lift, and the at least one electrical conductor connection is conveyed from the handrail to the control device of the lift, wherein the handrail is configured to enable a user to hold it or be guided by it.

2. Switch arrangement according to claim 1, wherein the at least one pushbutton, the at least one plate element and the at least one recognition element are provided with a thin overall layer thickness dimensioned in a millimeter range.

3. Switch arrangement according to claim 1, wherein the handrail is provided with a circular, angular, or other form of cross-section.

4. Switch arrangement according to claim 1, wherein a module is formed with the at least one elastically deformable plate element with the at least one pushbutton, with an identification of the at least one pushbutton on an upper side, the at least one recognition element, and the electrical conductor connection.

5. Switch arrangement according to claim 4, wherein the at least one pushbutton comprises a plurality of pushbuttons and the at least one elastically deformable plate element consists of a single plate element, the plurality of pushbuttons being formed in the module by the single plate element without gaps at their circumferences, and without any projections for damage caused by misuse.

6. Switch arrangement according to claim 1, further comprising a mechanical coupling piece arranged for bridging a distance between each of the at least one elastically deformable plate element and a respective one of the at least one pushbutton and the at least one recognition element, by means of which, when the at least one pushbutton is pressed, a transfer takes place of the bending of the at least one pushbutton via this coupling piece onto the at least one recognition element.

7. Switch arrangement according to claim 1, wherein a corresponding evaluation unit is assigned to the at least one recognition element, which is connectable by the at least one electrical conductor connection to the control device.

8. Switch arrangement according to claim 1, wherein each of the at least one pushbutton is provided with identification by means of at least one number, a character, and/or a letter in order to display a desired story of the lift, an alarm button, opening and closing buttons for a door of the lift, an outside call button, and/or buttons for other functions.

9. Switch arrangement according to claim 1, wherein the at least one recognition element of the at least one pushbutton, connected by lines to the control device of the lift, is provided with a power supply at a voltage of 3V to 24V.

10. Switch arrangement according to claim 1, wherein each of the at least pushbutton defines an effective button delimited by a peripheral line at its outer circumference, by another color, by a different material than outside the at least pushbutton and/or another identifier of the button at least pushbutton which is to be touched.

11. Switch arrangement according to claim 1, wherein the at least one pushbutton is installed in or at a specific part of the lift in a sealed manner.

12. Switch arrangement according to claim 1, wherein the at least one pushbutton comprises a plurality of pushbuttons.

13. Switch arrangement according to claim 12, wherein the at least one recognition element comprises a single recognition element configured to detect bending of all of the plurality of pushbuttons.

14. Switch arrangement according to claim 1, wherein the handrail has a rectangular cross-section.

15. Switch arrangement according to claim 1, wherein the handrail has a circular cross-section.

16. Switch arrangement according to claim 1, further comprising at least one transverse strip that secures the handrail to a wall of a cabin of the lift.

17. Switch arrangement according to claim 16, wherein the electrical conductor connection is guided through the at least one transverse strip.

18. Switch arrangement according to claim 1, further comprising means for securing the handrail to a wall of a cabin of the lift.

19. Switch arrangement according to claim 1, further comprising a detachable cover on an underside of the handrail.

20. Switch arrangement according to claim 19, wherein the detachable cover is spaced from the at least one recognition element.

* * * * *